United States Patent
Taoka et al.

(10) Patent No.: US 10,919,468 B2
(45) Date of Patent: Feb. 16, 2021

(54) VEHICULAR ELECTRIC POWER SUPPLY SYSTEM

(71) Applicant: TOYOTA JIDOSHA KABUSHIKI KAISHA, Toyota (JP)

(72) Inventors: Yasuhiro Taoka, Nagoya (JP); Yasuharu Terada, Toyota (JP); Takahiro Ito, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 16/272,298

(22) Filed: Feb. 11, 2019

(65) Prior Publication Data

US 2019/0256018 A1   Aug. 22, 2019

(30) Foreign Application Priority Data

Feb. 22, 2018   (JP) .............................. JP2018-029987

(51) Int. Cl.

| B60R 16/033 | (2006.01) |
| B60L 50/60 | (2019.01) |
| B60L 58/19 | (2019.01) |
| B60W 50/023 | (2012.01) |
| B60L 3/00 | (2019.01) |
| B60W 50/02 | (2012.01) |
| B60L 3/04 | (2006.01) |
| B60L 50/64 | (2019.01) |
| B60L 58/21 | (2019.01) |

(52) U.S. Cl.
CPC .......... *B60R 16/033* (2013.01); *B60L 3/0046* (2013.01); *B60L 3/0069* (2013.01); *B60L 3/0092* (2013.01); *B60L 3/04* (2013.01); *B60L 50/64* (2019.02); *B60L 50/66* (2019.02); *B60L 58/19* (2019.02); *B60L 58/21* (2019.02); *B60W 50/023* (2013.01); *B60W 50/0205* (2013.01)

(58) Field of Classification Search
CPC ........ B60R 16/033; B60L 50/64; B60L 50/66; B60L 58/19; B60L 58/21; B60L 3/0046; B60L 3/0069; B60L 3/0092; B60L 3/04; B60W 50/0205; B60W 50/023
See application file for complete search history.

(56) References Cited

U.S. PATENT DOCUMENTS

| 5,365,153 A | 11/1994 | Fujita et al. | |
| 2018/0001850 A1* | 1/2018 | Kontani | .................... H02J 1/10 |
| 2019/0243434 A1* | 8/2019 | Niwa | ..................... H02H 3/006 |

FOREIGN PATENT DOCUMENTS

| DE | 102013225020 A1 | 6/2015 |
| DE | 102014208201 A1 | 11/2015 |
| DE | 102015200124 A1 | 7/2016 |
| JP | H06-014405 A | 1/1994 |
| JP | 2004-135371 A | 4/2004 |
| WO | 2006/082125 A1 | 8/2006 |

\* cited by examiner

*Primary Examiner* — Carlos Amaya
(74) *Attorney, Agent, or Firm* — Oliff PLC

(57) ABSTRACT

A vehicular electric power supply system that is mounted in a vehicle includes: a load is configured to be supplied with electric power from one or both of a first-series electric power supply line and a second-series electric power supply line that are provided independently of each other; a first battery; a second battery; and a connection control device is configured to control connection of the first battery and the second battery to the first-series electric power supply line and the second-series electric power supply line, based on a state of the vehicle.

10 Claims, 3 Drawing Sheets

VEHICULAR ELECTRIC POWER SUPPLY SYSTEM

INCORPORATION BY REFERENCE

The disclosure of Japanese Patent Application No. 2018-029987 filed on Feb. 22, 2018 including the specification, drawings and abstract is incorporated herein by reference in its entirety.

BACKGROUND

1. Technical Field

The disclosure relates to a vehicular electric power supply system.

2. Description of Related Art

In each of Japanese Patent Application Publication No. 6-014405 (JP 6-014405 A) and Japanese Patent Application Publication No. 2004-135371 (JP 2004-135371 A), there is disclosed a vehicular electric power supply system that constitutes a redundant electric power supply by being equipped with two-series electric power supplies provided with batteries that are independent of each other.

SUMMARY

The vehicular electric power supply system described in each of the foregoing Japanese Patent Application Publication No. 6-014405 (JP 6-014405 A) and the foregoing Japanese Patent Application Publication No. 2004-135371 (JP 2004-135371 A) is configured such that each of the two batteries serves to supply electric power for one of the two-series electric power supplies. Therefore, each of the batteries must have a capacity that makes it possible to provide the entire electric power required by a load connected to a corresponding one of the two-series electric power supplies. Therefore, the total capacity of the batteries that are mounted in the electric power supply system is large, so there is a problem in that the cost and weight of the electric power supply system increase.

The disclosure provides a vehicular electric power supply system that can constitute a redundant electric power supply and that can reduce the cost and weight of mounted batteries.

A vehicular electric power supply system according to a first aspect of the disclosure is mounted in a vehicle. The vehicular electric power supply system includes: a load is configured to be supplied with electric power from one or both of a first-series electric power supply line and a second-series electric power supply line that are provided independently of each other; a first battery is configured to be connectable to both the first-series electric power supply line and the second-series electric power supply line and be connected to one of the first-series electric power supply line and the second-series electric power supply line; a second battery is configured to be connectable to both the first-series electric power supply line and the second-series electric power supply line and be connected to one of the first-series electric power supply line and the second-series electric power supply line; and a connection control device is configured to control connection of the first battery and the second battery to the first-series electric power supply line and the second-series electric power supply line, based on a state of the vehicle.

According to the aforementioned aspect, the first battery and the second battery can be connected to the first-series electric power supply line and the second-series electric power supply line. Owing to this configuration, the redundant electric power supply can be constituted. Furthermore, it is also possible to connect the two batteries to one of the electric power supply lines. Therefore, the cost and weight of the mounted batteries can be reduced.

In the aforementioned aspect, the vehicle may be configured to be able to make a changeover between a manual operation state and an automatic operation state. The state of the vehicle may include at least one of a manual operation state where the vehicle runs through manual operation by a driver of the vehicle and an automatic operation state where the vehicle runs through automatic operation.

In the aforementioned aspect, the connection control device may be configured to connect both the first battery and the second battery in parallel to the first-series electric power supply line when the vehicle is in the manual operation state.

According to the aforementioned configuration, when the vehicle is in the manual operation state, the first battery and the second battery are comprehensively treated, and both the batteries are connected in parallel to the first-series electric power supply line. Owing to this configuration, the first battery and the second battery can provide the electric power required by the load, using the sum of the capacities of the two batteries. Therefore, the total capacity of the batteries that are mounted in the electric power supply system is smaller than in the configuration in which each one of the batteries is required to provide the electric power required by the load.

In the aforementioned aspect, the connection control device may connect the first battery to the first-series electric power supply line, and connect the second battery to the second-series electric power supply line when the vehicle is in the automatic operation state.

According to the aforementioned configuration, when the vehicle changes over from the manual operation state to the automatic operation state, the battery comprehensively treated at the time of manual operation is divided into the first battery and the second battery, and each of the batteries is connected to each of the electric power supply lines. Owing to this configuration, a redundant electric power supply configuration can be formed at the time of automatic operation, without separately preparing a battery for backup.

In the aforementioned aspect, the connection control device may connect, when an electric power supply failure occurs in one of the first-series electric power supply line and the second-series electric power supply line, both the first battery and the second battery in parallel to the other of the first-series electric power supply line and the second-series electric power supply line.

According to the aforementioned configuration, when an electric power supply failure occurs in one of the first-series electric power supply line and the second-series electric power supply line, both the first battery and the second battery are connected in parallel to the other of the first-series electric power supply line and the second-series electric power supply line. Owing to this configuration, even when an electric power supply failure occurs in one of the electric power supply lines, the supply of electric power to the load can be continued from the other electric power supply line.

In the aforementioned aspect, the connection control device may be configured to connect the first battery and the second battery to the first-series electric power supply line such that the first battery and the second battery are connected in parallel to each other, in connecting both the first battery and the second battery to the first-series electric power supply line, and connect the first battery and the second battery to the second-series electric power supply line such that the first battery and the second battery are connected in parallel to each other, in connecting both the first battery and the second battery to the second-series electric power supply line.

According to the aforementioned configuration, the two batteries can be comprehensively treated in connecting both the first battery and the second battery to one of the electric power supply lines.

Each of the aspects of the aforementioned disclosure makes it possible to constitute the redundant electric power supply and reduce the cost and weight of the mounted batteries.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

[Outline] In a vehicular electric power supply system according to the disclosure in which two-series electric power supply lines are redundantly configured, two auxiliary batteries are prepared in a divided manner. The two auxiliary batteries are used after being connected in parallel to the main electric power supply line at the time of manual operation, and the two auxiliary batteries are used after being connected in a divided manner to the electric power supply lines respectively at the time of automatic operation. Owing to this configuration, the two auxiliary batteries can be used as a single auxiliary battery at the time of manual operation, and one of the auxiliary batteries can be used as a backup electric power supply at the time of automatic operation. Therefore, the cost and weight of the batteries can be reduced.

Figure 1:
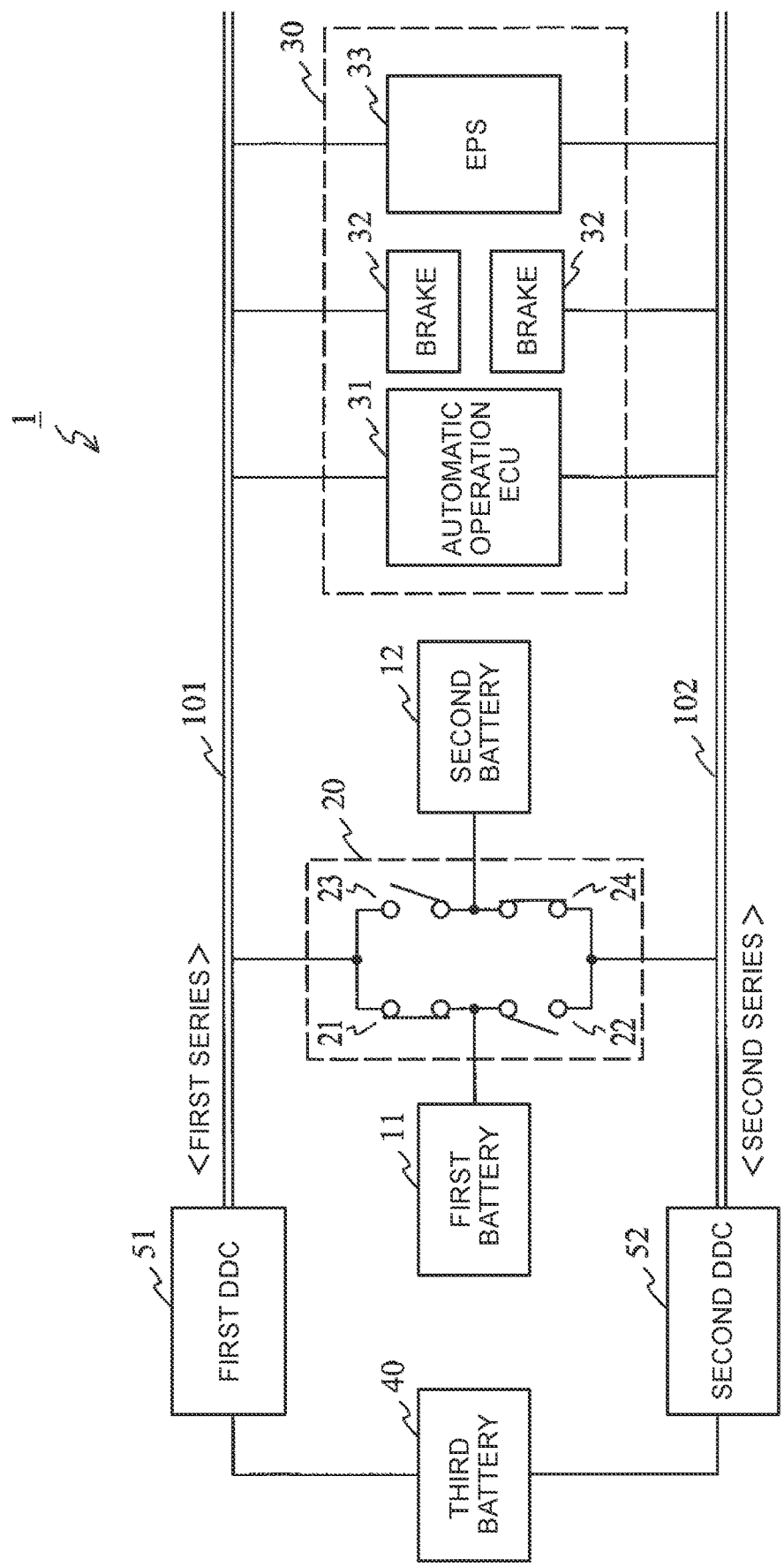
FIG. 1 is a view showing an overall configuration of a vehicular electric power supply system according to the embodiment of the disclosure.

[Configuration] FIG. 1 is a view showing the overall configuration of a vehicular electric power supply system 1 according to one embodiment of the disclosure. The vehicular electric power supply system 1 shown in FIG. 1 is configured to be equipped with a first battery 11, a second battery 12, a connection control device 20, a load 30, a third battery 40, a first DCDC converter (a DDC) 51, and a second DCDC converter (a DDC) 52.

The vehicular electric power supply system 1 according to the present embodiment is mounted in a vehicle that can make a changeover between manual operation by a driver and automatic operation based on an automatic operation function.

The third battery 40 is an electric power storage element that is configured in a chargeable/dischargeable manner, for example, a lithium-ion battery or the like. The third battery 40 is configured to be able to supply the electric power accumulated therein to the first DCDC converter 51 and the second DCDC converter 52 in parallel. A high-voltage battery for driving a vehicle is an example of this third battery 40.

The first DCDC converter 51 is configured to be able to convert the high-voltage electric power supplied from the third battery 40 into a predetermined low-voltage electric power, and output this low-voltage electric power to a first-series electric power supply line 101. In the present vehicular electric power supply system 1, the electric power supply of the first-series electric power supply line 101 is used as a main electric power supply that supplies electric power to the load 30 at the time of manual operation of the vehicle.

The second DCDC converter 52 is configured to be able to convert the high-voltage electric power supplied from the third battery 40 into a predetermined low-voltage electric power, and output this low-voltage electric power to the second-series electric power supply line 102. In the present vehicular electric power supply system 1, the electric power supply of the second-series electric power supply line 102 is used as a redundant electric power supply that supplies electric power to the load 30 in parallel with the first-series electric power supply line 101 at the time of automatic operation of the vehicle.

Each of the first battery 11 and the second battery 12 is an electric power storage element that is configured in a chargeable/dischargeable manner, for example, a lead battery or the like. The first battery 11 and the second battery 12 are connected to the connection control device 20, and are configured to be able to output the electric power accumulated therein to the first-series electric power supply line 101 and the second-series electric power supply line 102 respectively in accordance with the control performed by the connection control device 20. A low-voltage (e.g., 12 V) auxiliary battery for the vehicle is an example of each of this first battery 11 and this second battery 12.

The connection control device 20 is configured to control connection of the first battery 11 and the second battery 12 to the first-series electric power supply line 101 and the second-series electric power supply line 102. This connection control device 20 includes four switches 21 to 24 such as relays or the like, and can individually control the opening/closing of these switches 21 to 24. The switch 21 is provided between the first battery 11 and the first-series electric power supply line 101, and connects the first battery 11 to the first-series electric power supply line 101 by being turned ON. The switch 22 is provided between the first battery 11 and the second-series electric power supply line 102, and connects the first battery 11 to the second-series electric power supply line 102 by being turned ON. The switch 23 is provided between the second battery 12 and the first-series electric power supply line 101, and connects the second battery 12 to the first-series electric power supply line 101 by being turned ON. The switch 24 is provided between the second battery 12 and the second-series electric power supply line 102, and connects the second battery 12 to the second-series electric power supply line 102 by being turned ON.

The load 30 includes one or more in-vehicle devices that can be supplied with electric power from one or both of the first-series electric power supply line 101 and the second-series electric power supply line 102. In FIG. 1, a device regarding the control of automatic operation (an automatic operation ECU) 31, a device regarding the control of brakes 32, a device regarding the control of electric steering (an EPS) 33, and the like are exemplified as the load 30, but the load 30 is not limited thereto. Incidentally, the automatic operation ECU 31, the brakes 32, and the EPS 33 exemplified in FIG. 1 are important loads that perform the function of safely evacuating the vehicle in case of emergency such as an electric power supply line failure and that are required for automatic operation.

[Connection Control] Next, connection control of the switches 21 to 24 performed by the connection control device 20 of the vehicular electric power supply system 1 according to the embodiment of the disclosure will be described with further reference to FIGS. 2A, 2B, and 2C.

Figure 2A:
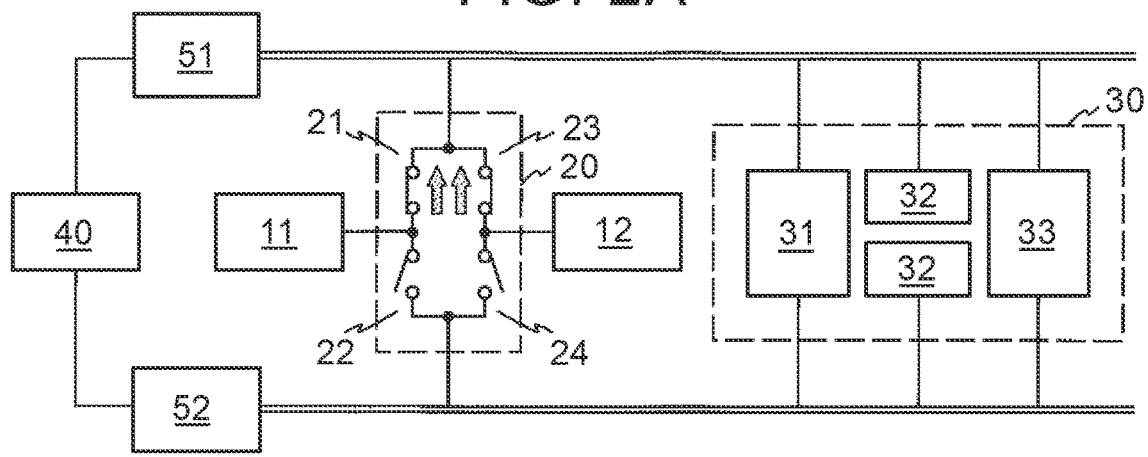
FIG. 2A is a view illustrating connection states of switches in a connection control device at the time of manual operation.

FIG. 2A is a view illustrating connection states of the switches 21 to 24 in the connection control device 20 in the case where the vehicle is in a manual operation state. At the time of this manual operation, the switches 21 and 23 are ON, and the switches 22 and 24 are OFF. Accordingly, the connection control device 20 is configured such that both the first battery 11 and the second battery 12 are connected in parallel to the first-series electric power supply line 101.

In the configuration at the time of this manual operation, the first battery 11 and the second battery 12 are regarded as a single battery (an auxiliary battery) and comprehensively treated. Thus, using the sum of capacities of the first battery 11 and the second battery 12, the electric power required by the load 30 may be provided. Therefore, the total capacity of the batteries mounted in the vehicular electric power supply system 1 can be made smaller than in the configuration of the related document in which each one of the batteries is required to provide the electric power required by the load 30. For example, in the case where the battery capacity that is needed to provide the electric power required by the load 30 is 40 Ah, the capacity of each of the first battery 11 and the second battery 12 can be 20 Ah.

Figure 2B:
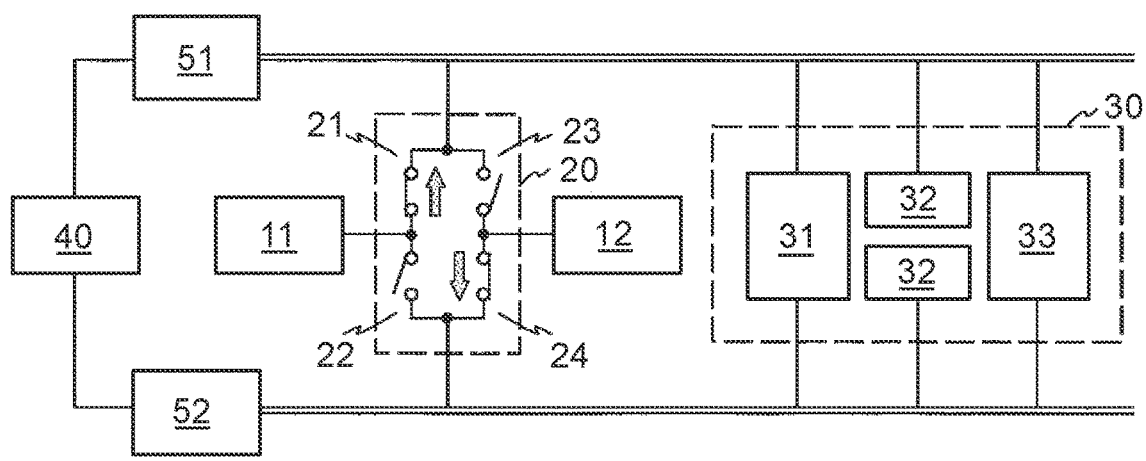
FIG. 2B is a view illustrating connection states of the switches in the connection control device at the time of automatic operation.

FIG. 2B is a view illustrating connection states of the switches 21 to 24 in the connection control device 20 in the case where the vehicle is in an automatic operation state. At the time of this automatic operation, the switches 21 and 24 are ON, and the switches 22 and 23 are OFF. Accordingly, the connection control device 20 is configured such that the first battery 11 is connected to the first-series electric power supply line 101 and the second battery 12 is connected to the second-series electric power supply line 102.

In the configuration of this automatic operation, the battery comprehensively treated at the time of manual operation is divided into the first battery 11 and the second battery 12. One of the batteries supplies electric power to the load 30 via the first-series electric power supply line 101, and the other battery supplies electric power to the load 30 via the second-series electric power supply line 102. Thus, the second battery 12 as a single auxiliary battery can be utilized as a backup electric power supply. Therefore, a redundant electric power supply configuration can be formed at the time of automatic operation without separately preparing a battery for backup.

Figure 2C:
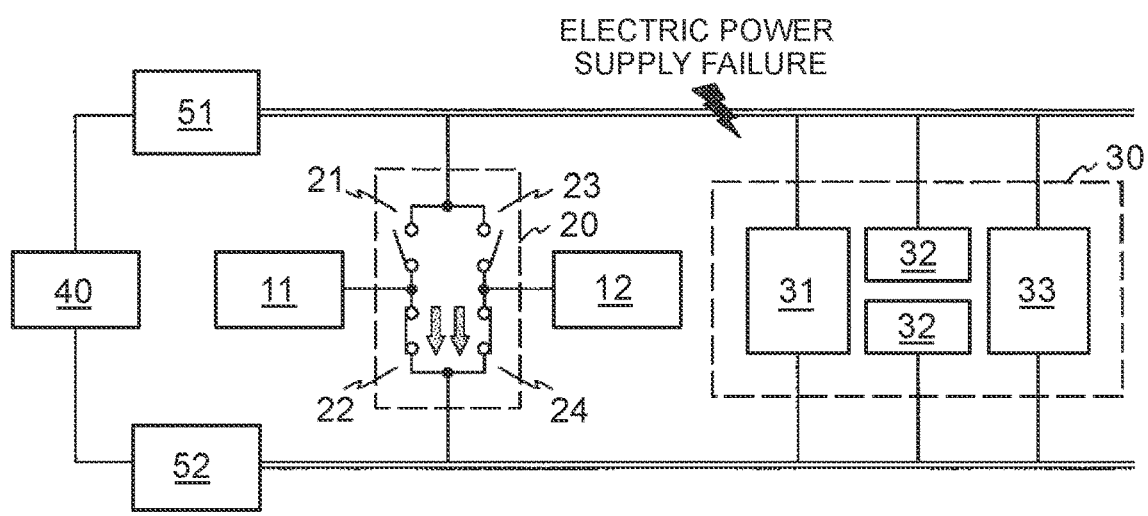
FIG. 2C is a view illustrating connection states of the switches in the connection control device at the time of an electric power supply failure.

FIG. 2C is a view illustrating connection states of the switches 21 to 24 in the connection control device 20 in the case where an electric power supply failure occurs in the first-series electric power supply line 101. At the time of this electric power supply failure, the switches 21 and 23 become OFF, and the switches 22 and 24 become ON. Accordingly, the connection control device 20 is configured such that both the first battery 11 and the second battery 12 are connected in parallel to the second-series electric power supply line 102.

Owing to this configuration, the supply of electric power to the load 30 can be continued even when an electric power supply failure occurs in the first-series electric power supply line 101. Incidentally, when an electric power supply failure occurs in the second-series electric power supply line 102, the switches 21 and 23 are ON, and the switches 22 and 24 are OFF. The connection control device 20 is configured such that both the first battery 11 and the second battery 12 are connected in parallel to the first-series electric power supply line 101.

Figure 3:
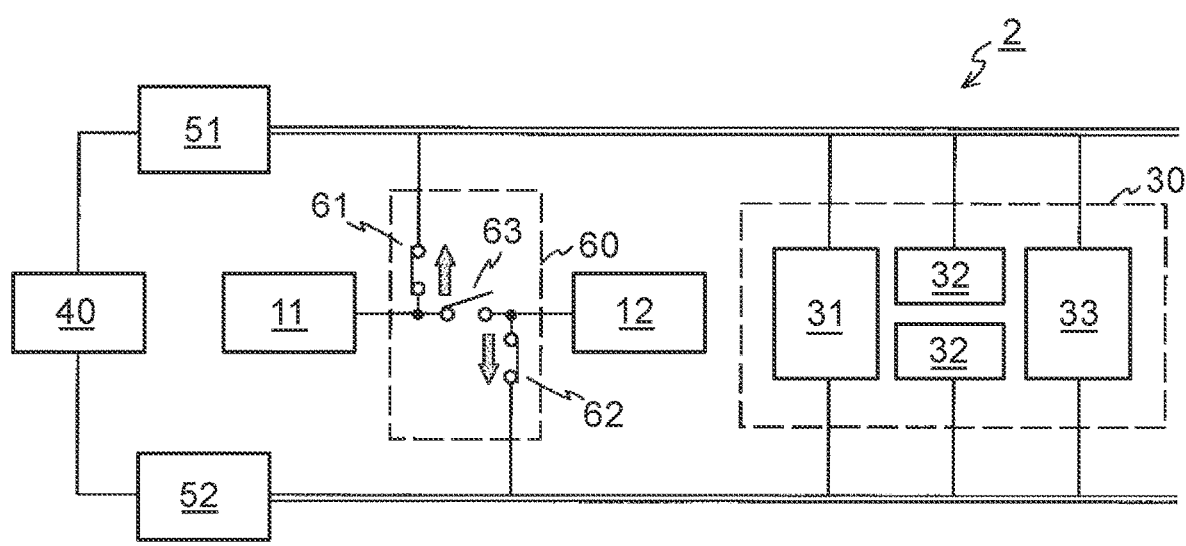
FIG. 3 is a view showing another overall configuration of the vehicular electric power supply system according to the present embodiment.

Incidentally, in the aforementioned embodiment, the vehicular electric power supply system 1 that is equipped with the connection control device 20 including the four switches 21 to 24 is exemplified. However, as shown in FIG. 3, a vehicular electric power supply system 2 that is equipped with a connection control device 60 including three switches 61 to 63 may be adopted.

In this connection control device 60, when the vehicle is in the manual operation state, the switches 61 and 63 are ON, and the switch 62 is OFF. Also, both the first battery 11 and the second battery 12 are connected in parallel to the first-series electric power supply line 101. Besides, when the vehicle is in the automatic operation state, the switches 61 and 62 are ON, and the switch 63 is OFF (in a state shown in FIG. 3). Also, the first battery 11 is connected to the first-series electric power supply line 101, and the second battery 12 is connected to the second-series electric power supply line 102. Besides, when an electric power supply failure occurs in one of the electric power supply lines, only the switch connected to the electric power supply line where the electric power supply failure has occurred is turned OFF, and all the other switches are turned ON. Also, both the first battery 11 and the second battery 12 are connected in parallel to the electric power supply line where no electric power supply failure has occurred.

[Operation and Effect of Present Embodiment] With each of the above-mentioned vehicular electric power supply systems 1 and 2 according to the present embodiment, when the vehicle is in the manual operation state, both the first battery 11 and the second battery 12 are connected in parallel to the first-series electric power supply line 101. Owing to this configuration, the first battery 11 and the second battery 12 may provide the electric power required by the load 30, using the sum of the capacities of the two batteries. Therefore, the total capacity of the batteries that are mounted in each of the electric power supply systems 1 and 2 is smaller than in the configuration in which each one of the batteries must provide the electric power required by the load.

Besides, with each of the vehicular electric power supply systems 1 and 2 according to the present embodiment, when the vehicle changes over from the manual operation state to the automatic operation state, the single battery is divided into the first battery 11 and the second battery 12, and the first battery 11 and the second battery 12 are connected to the first-series electric power supply line 101 and the second-series electric power supply line 102 respectively. Owing to this configuration, the redundant electric power supply configuration can be formed at the time of automatic operation without separately preparing a battery for backup.

Furthermore, with each of the vehicular electric power supply systems 1 and 2 according to the present embodiment, when an electric power supply failure occurs in one of the first-series electric power supply line 101 and the second-series electric power supply line 102, both the first battery 11 and the second battery 12 are connected in parallel to the other of the first-series electric power supply line 101 and the second-series electric power supply line 102 where no electric power supply failure has occurred. Owing to this configuration, even when an electric power supply failure occurs in one of the electric power supply lines, the supply of electric power to the load can be continued from the other electric power supply line.

The vehicular electric power supply system according to the disclosure can be utilized in a vehicle that can make a changeover between manual operation and automatic operation and that has two-series redundantly configured electric power supplies, or the like. It should be noted, however, that the vehicular electric power supply system according to the disclosure may also be utilized in a vehicle that does not have the automatic operation function, or the like, as long as a redundant electric power supply is configured in the vehicle. Besides, the vehicular electric power supply system according to the disclosure may also be utilized in a vehicle that carries out only automatic operation based on the automatic operation function, or the like.

What is claimed is:

1. A vehicular electric power supply system that is mounted in a vehicle, comprising:
    a load is configured to be supplied with electric power from one or both of a first-series electric power supply line and a second-series electric power supply line that are provided independently of each other;
    a first battery is configured to
        be connectible to both the first-series electric power supply line and the second-series electric power supply line and
        be connected to one of the first-series electric power supply line and the second-series electric power supply line;
    a second battery is configured to
        be connectible to both the first-series electric power supply line and the second-series electric power supply line and
        be connected to one of the first-series electric power supply line and the second-series electric power supply line; and
    a connection control device is configured to control connection of the first battery and the second battery to the first-series electric power supply line and the second-series electric power supply line, based on a state of the vehicle,
    wherein the vehicle is configured to be able to make a changeover between a manual operation state and an automatic operation state, and
    the connection control device is configured to connect both the first battery and the second battery in parallel to the first-series electric power supply line when the vehicle is in the manual operation state.

2. The vehicular electric power supply system according to claim 1,
    wherein in the manual operation state, the vehicle runs through manual operation by a driver of the vehicle and in the automatic operation state, the vehicle runs through automatic operation.

3. The vehicular electric power supply system according to claim 1, wherein the connection control device is configured to, when the vehicle is in the automatic operation state,
    connect the first battery to the first-series electric power supply line and
    connect the second battery to the second-series electric power supply line.

4. The vehicular electric power supply system according to claim 2, wherein the connection control device is configured to, when the vehicle is in the automatic operation state,
    connect the first battery to the first-series electric power supply line and
    connect the second battery to the second-series electric power supply line.

5. The vehicular electric power supply system according to claim 1, wherein the connection control device is configured to connect, when an electric power supply failure occurs in one of the first-series electric power supply line and the second-series electric power supply line, both the first battery and the second battery in parallel to the other of the first-series electric power supply line and the second-series electric power supply line.

6. The vehicular electric power supply system according to claim 1, wherein the connection control device is configured to
    connect the first battery and the second battery to the first-series electric power supply line such that the first battery and the second battery are connected in parallel to each other, in connecting both the first battery and the second battery to the first-series electric power supply line, and
    connect the first battery and the second battery to the second-series electric power supply line such that the first battery and the second battery are connected in parallel to each other, in connecting both the first battery and the second battery to the second-series electric power supply line.

7. A vehicular electric power supply system that is mounted in a vehicle, comprising:
    a load is configured to be supplied with electric power from one or both of a first-series electric power supply line and a second-series electric power supply line that are provided independently of each other;
    a first battery is configured to
        be connectible to both the first-series electric power supply line and the second-series electric power supply line and
        be connected to one of the first-series electric power supply line and the second-series electric power supply line;
    a second battery is configured to
        be connectible to both the first-series electric power supply line and the second-series electric power supply line and
        be connected to one of the first-series electric power supply line and the second-series electric power supply line; and
    a connection control device is configured to control connection of the first battery and the second battery to the first-series electric power supply line and the second-series electric power supply line, based on a state of the vehicle,
    wherein the vehicle is configured to be able to make a changeover between a manual operation state and an automatic operation state, and the connection control device is configured to, when the vehicle is in the automatic operation state,
connect the first battery to the first-series electric power supply line and
connect the second battery to the second-series electric power supply line.

8. The vehicular electric power supply system according to claim 7,
wherein in the manual operation state, the vehicle runs through manual operation by a driver of the vehicle and
in the automatic operation state, the vehicle runs through automatic operation.

9. The vehicular electric power supply system according to claim 7, wherein the connection control device is configured to connect, when an electric power supply failure occurs in one of the first-series electric power supply line and the second-series electric power supply line, both the first battery and the second battery in parallel to the other of the first-series electric power supply line and the second-series electric power supply line.

10. The vehicular electric power supply system according to claim 7, wherein the connection control device is configured to
connect the first battery and the second battery to the first-series electric power supply line such that the first battery and the second battery are connected in parallel to each other, in connecting both the first battery and the second battery to the first-series electric power supply line, and
connect the first battery and the second battery to the second-series electric power supply line such that the first battery and the second battery are connected in parallel to each other, in connecting both the first battery and the second battery to the second-series electric power supply line.

* * * * *